United States Patent [19]

Kaebitzsch

[11] 4,215,267
[45] Jul. 29, 1980

[54] FOOD WARMER WITH A HEATING ELEMENT ASSEMBLY MOUNT

[75] Inventor: Johannes W. Kaebitzsch, Algonquin, Ill.

[73] Assignee: McGraw-Edison Company, Elgin, Ill.

[21] Appl. No.: 926,081

[22] Filed: Jul. 19, 1978

[51] Int. Cl.² .................................................. F27D 11/08
[52] U.S. Cl. ..................................... 219/439; 219/432; 219/434; 219/462; 219/530; 219/536; 219/438
[58] Field of Search ............... 219/429, 430, 432, 433, 219/435, 436, 438, 439, 450, 456, 462, 460, 530, 536, 537, 540

[56] References Cited

U.S. PATENT DOCUMENTS

| | | | |
|---|---|---|---|
| 2,664,495 | 12/1953 | Wehrli | 219/438 |
| 2,691,717 | 10/1954 | Huck | 219/462 |
| 2,817,744 | 12/1957 | Free | 219/439 |
| 2,847,552 | 8/1958 | Gates | 219/434 |
| 2,888,548 | 5/1959 | Knapp | 219/435 |
| 3,519,798 | 7/1970 | Walther | 219/439 |
| 3,909,592 | 9/1975 | Eide | 219/462 |
| 4,045,654 | 8/1977 | Eide | 219/449 |

FOREIGN PATENT DOCUMENTS

| | | | |
|---|---|---|---|
| 47601 | 3/1930 | Norway | 219/430 |
| 60647 | 3/1939 | Norway | 219/462 |

*Primary Examiner*—Volodymyr Y. Mayewsky
*Attorney, Agent, or Firm*—Dale A. Kubly; Bruce R. Mansfield; Ronald J. LaPorte

[57] ABSTRACT

A built-in well type food warmer includes a heating element assembly which is separably engaged with the underside of a food well by adjustable hanger members. The heating element assembly includes an upper heat distribution plate which is nestable within a recess formed in the bottom of the food well. The heating element assembly is enclosed by a tray member which is resiliently mounted within an enclosure. Brackets extending outwardly from the enclosure are attached to the lower ends of baffle hangers which extend downwardly from an upper rim of the food well. The hangers are formed of two separable members, adjustably connected together for selectively adjusting the length of the hanger. As the hangers are shortened, the heating element assembly is resiliently biased into contact with the bottom surface of the food well within a recessed portion thereof.

11 Claims, 3 Drawing Figures

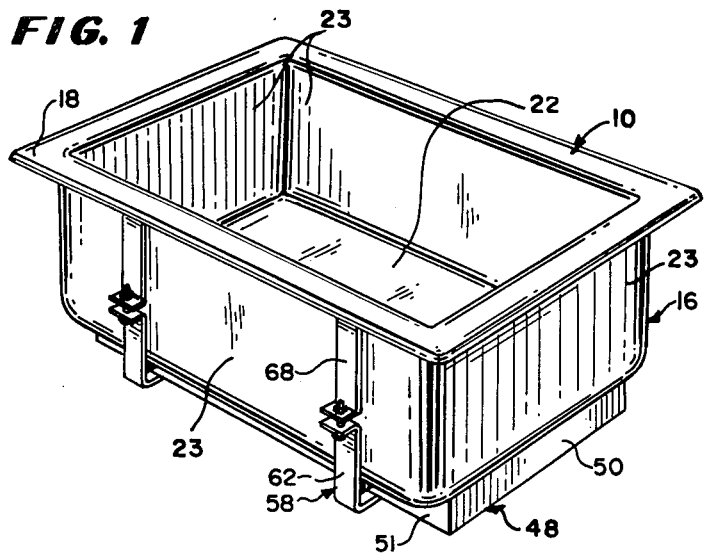
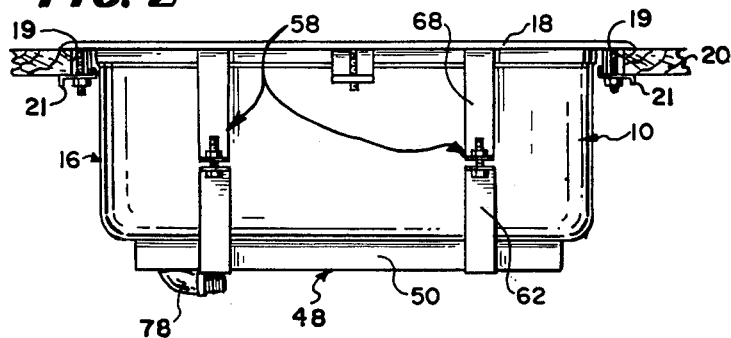
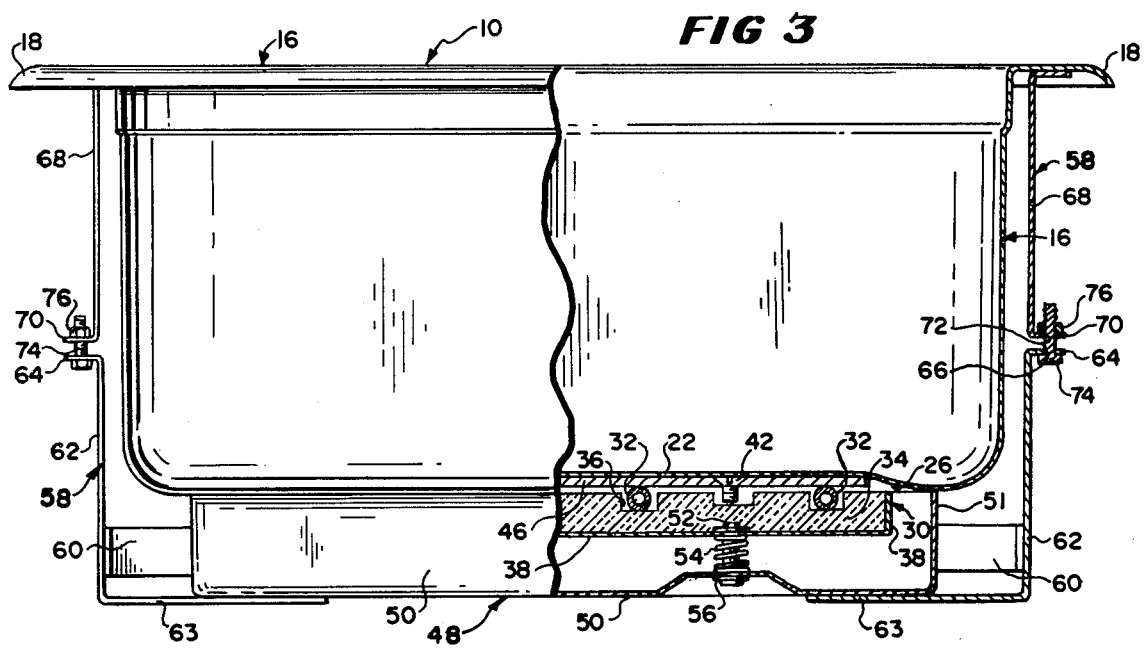

FOOD WARMER WITH A HEATING ELEMENT ASSEMBLY MOUNT

BACKGROUND OF THE INVENTION

The invention relates generally to well type food warmers which are built into a countertop.

Such food warmers are provided with heating elements located under the food well. Welded securements formed on the bottom wall of the food well, such as those presently used to support heating assemblies, are known to oxidize, causing adjacent areas of the food well also to oxidize and rust through. In servicing the heating element of these food warmers, it is desirable to avoid removal of the entire food well assembly from the countertop. Hence a seperable securement of the heating element assembly to the food well is particularly advantageous. Since local sanitation regulations frequently require that a seal be maintained between the food warmer and the counter to which it is mounted, it is desirable to remove the heating element assembly for required servicing without removing or otherwise disturbing the food well and seal therefor.

Accordingly, it is an object of the invention to provide securement of the heat element assembly to the food well without using welds. It is another object of this invention to provide a well type food warmer with a heating element assembly and mounting means therefor which are quickly and easily separable from the food well. It is also an object of this invention to provide a heating element assembly capable of removal from the food well without requiring removal of the food well from the counter to which it is mounted.

SUMMARY OF THE INVENTION

The foregoing objects are accomplished in accordance with this invention, in one form thereof, by providing an improved built-in well type food warmer including a deep well having an outwardly extending rim near the upper end thereof, and a bottom wall. A heating element subassembly, separably engaged with the bottom wall of the deep well, includes a heating element which is biased for upward movement and which is resiliently mounted within an upwardly opening tray-like enclosure member. A heat distribution plate covers the top of the heating element subassembly and is securely engaged therewith.

Before mounting the food warmer in a countertop or like support surface, the upper edge of the heating element enclosure is raised and brought into contact with the outer portions of the deep well bottom wall, resulting in heat conducting contact between the upwardly biased heat distribution plate contained within the enclosure, and deep well bottom wall. Secure contact between the heating element enclosure and the bottom wall ensures that a predetermined upward force will be applied to the heat distribution plate by the resilient mounting means which receive bearing support from the bottom wall of the element enclosure.

This contact between the deep well bottom wall and the heat distribution plate and element enclosure of the heating element assembly is maintained by a plurality of brackets which extend downwardly from the rim of the deep well to attach to and thereby support the heating element enclosure at the bottom wall thereof. These brackets are adjustable in length, and when shortened, provide the proper contact between the upper edge of the heating element enclosure and the food well bottom wall. This contact in turn determines the proper upward bias of the heat distribution plate resiliently mounted in the heating element enclosure, owing to the fixed predetermined distance between the bottom walls of the deep well which is disposed immediately above the heat distribution plate, and the heating element enclosure which supports the plate's resilient mounting.

Further, the adjustable brackets are comprised of two sections connected end to end, separable from each other, with the outer ends of the sections being joined to the deep well rim and the bottom wall of the element enclosure, respectively. The adjacent portions of these bracket sections are drawn together by screw adjusting means, and are separable from each other, allowing the heating element assembly to be detached from the deep well, especially once the deep well is permanently and fixedly mounted in a countertop.

Installation of the food warmer in a countertop or like mounting surface is performed after the heating element assembly is first secured to the food well by the adjustable brackets as described above. A suitable mounting hole is provided in a countertop with the heating element assembly and bottom portions of the deep well being inserted therein until the rim of the deep well contacts and receives support from the countertop. A gasket is inserted between the rim and the countertop to prevent the migration of grease within the counter, as is frequently required by local sanitation regulations. The food well rim is then clamped or otherwise secured to the countertop. The seperable connection of the adjustable bracket sections allows removal of the heating element assembly connected to one section from the deep well connected to the other section without disturbing the seal between the deep well rim and the countertop to which the food warmer is mounted.

Should the heating element require servicing after installation of the food warmer, the heating element assembly and lower bracket portions attached thereto are released from the corresponding upper bracket portions, allowing the deep well and seal therefor to remain permanently attached to the counter top.

After the required servicing is completed, the heating element assembly is engaged with the deep well bottom wall, and the lower bracket portions are reconnected and drawn towards the upper bracket portions, reestablishing the afore-mentioned proper bias of the heat distribution plate.

Other objects and further details of that which is believed to be novel in the built-in food warmer of this invention will be clear from the following description and claims taken with the accompanying drawings.

DESCRIPTION OF THE DRAWINGS

In the drawings:

FIG. 1 is a perspective view of a food warmer according to the present invention;

FIG. 2 is a side elevational view of the food warmer according to the present invention shown mounted in a counter top;

FIG. 3 is an end elevational view partially broken away to show the heating element assembly and supporting means thereof according to the present invention;

DESCRIPTION OF THE PREFERRED EMBODIMENT

One form of the food warmer according to the present invention is shown in FIGS. 1–3. Referring especially to FIG. 1, the built-in food warmer 10 includes a deep food well 16 having a bottom wall 22, side walls 23, and an outwardly extending rim 18 which surrounds the tops of the side walls. A heating element assembly 48 is held in engagement with bottom wall 22 by support assembly 58.

Referring now to FIG. 3, the heating element assembly 48 of FIGS. 1 and 2 is shown in greater detail. Subassembly 30, a portion of heat element assembly 48, contains heating elements 32 carried within slots 36 of thermal insulator plate 34 which is received within an upwardly opening tray member 38. A planar heat distribution plate 46, the uppermost portion of assembly 48 and subassembly 30 thereof, covers heating elements 32 and is fixedly attached to plate 34 by screws 42 which engage nuts, not shown, embedded in plate 34. The heat distribution plate 46, heating elements 32, thermal insulator plate 34, and tray member 38 comprising heating element subassembly 30 are mounted to the bottom wall of tray-like enclosure 50 by shoulder pin 52 and retainer rings 56. Springs 54, only one of which is shown, impart an upward bias to the heating element subassembly 30 and ultimately to the heat distribution plate 46 thereof. The lower end of shoulder pin 52 is retained against the upward force of springs 54 by ring 56, imparting a balancing downward force to enclosure 50. It can thus be seen that the heating element subassembly 30 is resiliently mounted with respect to enclosure 50, and is vertically movable while being biased in an upward direction.

As is shown in FIG. 3, the heating element assembly 48 is brought into engagement with deep well bottom wall 22 during assembly of the food warmer 10 and prior to its installation into a countertop. The deep well bottom wall 22 has an interior recessed portion 26 into which the heating element subassembly 30 is received during assembly of the food warmer 10. As assembly 48 is installed in position, heat distribution plate 46 is the first component of heating element subassembly 30 to contact the deep well 16 at its bottom wall 22 in recess 26 thereof. Owing to the resilient mounting provided by pins 52 and spring 54, the heating element subassembly 30 is deflected downwardly during installation, until the upper edges of enclosure 50 engage the outer portions of bottom wall 22, establishing a predetermined downward deflection or "set" to springs 54. This predetermined deflection of springs 54 establishes the predetermined compressive force engaging heat distribution plate 46 in heat conducting relationship with bottom wall 22.

As is shown in FIGS. 1 and 2, two rigid elongated hanger, or support assemblies 58 secure one side of heating element assembly 48 to deep well 16. A similiar pair of support assemblies 58 secure the opposing side of assembly 48 in like fashion. Each support assembly 58 includes an upper hanger 68 which is fixedly attached at its upper end to rim 18 of deep well 16, and a lower bracket 62, the lower end of which is fixedly attached to enclosure 50 of heating element assembly 48. The lower, inwardly extending portions 63 of bracket 62 are welded to enclosure 50 at its bottom wall, and the upper portions of hangers 68 are welded to the underside of flange 18. These are the only weld securements required of the support assembly 58, and neither securement contacts the deep well 16, especially at the bottom wall 22 thereof. Horizontally extending "L"-shaped brackets 60 are secured to the side walls 51 of enclosure 50 and to brackets 62, to provide added strength and rigidity as bracket 62 is drawn upwardly. The central end portions 64 and 70 of bracket 62 and hanger 68 respectively, extend outwardly and parallel to each other. Aligned holes 66, 72 in each end portion 64, 70 receive bolt 74 which is retained in place during assembly of food warmer 10 by nut 76. With one end of the bracket assembly 58 being secured to the deep well rim 18 and the other end secured to enclosure 50, it can be seen that as bolt 74 is advanced with respect to nut 76, that the hanger 68 and bracket 62 will be drawn together. Further, it can be seen that if deep well 16 is mounted to a countertop 20 as is shown in FIG. 2, enclosure 50, and hence heating element assembly 48, will be drawn upwardly into engagement with bottom wall 22 of deep well 16 as bolt 74 is advanced into nut 76. By advancing bolt 74, the required upward engaging force can be applied to enclosure 50, drawing upper edge of side wall 51 thereof into engagement with bottom wall 22. Once side walls 51 are brought into engagement with bottom wall 22, a predetermined distance between the bottom wall of deep well 16 and the bottom wall of enclosure 50 of heating assembly 48 is established. This in turn establishes a predetermined deflection of springs 54, with heat distribution plate 46 being pressed into engagement with bottom wall 22 and recessed portion 26 thereof. Thus, if enclosure 50 were not tightened sufficiently, the required bias of heat distribution plate 46 would not be obtained. On the other hand, if excessive force is imparted to enclosure 50 of assembly 48, side walls 51 could damage bottom wall 22. It can therefore be seen from the above discussion that applicant's support means 58 establish an accurate engaging force to be set up between enclosure 50 and deep well 16, which force can easily be measured by the tightening torque of bolts 74. Further, applicant's support means 58 allow quick and easy removal of the heating assembly 48 from the deep well 16, once the food warmer 10 is mounted in a counter. Also, should deep well 16 become dented or otherwise deformed after installation, the adjustable bracket supports 58, provide the required readjustment of the engaging force of enclosure 50.

The food warmer 10, shown installed in the countertop 20 of FIG. 2, is first completely assembled as shown in FIGS. 1 and 3, and thereafter inserted into an opening 19 in countertop 20. The heating element assembly 48 and lower portions of the deep well 16 are lowered into opening 19 from above the countertop 20 until rim 18 engages countertop 20, receiving support therefrom. A resilient gasket, not shown, is inserted between the rim 18 and countertop 20 to prevent the migration of grease and food matter from entering opening 19 and the interior of the counter beneath the top wall 20 thereof. Clamp 21 is applied to studs which extend downwardly from rim 18, and then tightened, drawing rim 18 and hence food warmer 10 into secure engagement with countertop 20. Although a specific clamp 21 is shown in FIG. 2, any conventional securement means could be substituted therefor. Heating elements 32 are then connected to an external source of electrical power, not shown, through electrical conductors disposed in power connector 78 of FIG. 2.

Once the food warmer 10 is permanently installed in countertop 20, it is especially important that the seal between the food warmer and the countertop is not broken during servicing of the heating element assembly 48, and particularly the heating elements 32 contained therein. It will be seen that applicant's invention provides easy removal of the heating element assembly 48 through the separable connection at the central end portions of hanger 68 and bracket 62. To remove the heating element assembly 48 and bracket 62 welded thereto, one need only disengage bolts 74 from nuts 76 to loosen and remove the enclosure 50 and remaining components of heating element assembly 48 from the hangers 68 which are firmly clamped to countertop 20. It can thus be seen that the seal between rim 18 and countertop 20 need not be disturbed when performing the required service on heating element assembly 48. This feature is particularly advantageous since local sanitation regulations require that an effective seal be maintained between the food warmer and the countertop mounting surface and each removal of the food well, especially after a prolonged period of service, jeopardizes the integrity of this seal and could require replacement thereof.

It can be seen that applicant's invention not only preserves the integrity of the seal between the food warmer and its mounting surface, but also preserves the integrity of the food well itself as no weld securements are required to be made thereto. Further, applicant's invention provides a quick and easy installation and removal of the heating element assembly from the installed deep well.

While a particular embodiment of the invention has been shown, other embodiments of the invention will be apparent to those skilled in the art, and it is intended to cover by the appended claims all the embodiments falling within the scope thereof.

What I claim as new and desired to secure by Letters Patent of the United States is:

1. A built-in well type food warmer comprising:
   an upwardly opening food well having a heat conductive bottom wall;
   a heating assembly including a thermal insulation means, a heating element supported by said thermal insulation means, a mounting member, resilient mounting means, and a thermally conductive member which is resiliently mounted by the resilient mounting means to the mounting member and which is sufficient to receive heat from said heating element, said thermally conductive member positioned to be brought into heat conducting engagement with the bottom wall of said food well when an upward force is applied to said heating assembly through the resilient mounting means, and
   supporting means secured to said food well at points romote from said heating assembly, said supporting means supporting said mounting member in engagement with the heat conductive bottom wall of said food well, said supporting means further imparting an upward force to said thermally conductive member through said resilient mounting means to bring said thermally conductive member into heat conducting relationship with the heat conductive bottom wall of said food well.

2. The food warmer of claim 1 wherein:
   said food well includes at its upper end an outwardly extending rim; and
   said supporting means are elongated and are secured at one end to said rim whereby support for said heating assembly is provided by said rim.

3. The food warmer of claim 1 wherein said supporting means includes adjustment means for selectively bringing said heating assembly into and out of engagement with the bottom wall of said food well whereby said thermally conductive member is brought into and out of heat conducting relationship with the bottom wall of said food well.

4. The food warmer of claim 1 wherein said supporting means are formed of a first section secured to said food well and a second section secured to said heating assembly, said first and second sections releasably secured to each other whereby, when said sections are connected and released, said heating assembly is brought into and out of engagement with the bottom wall of said food well.

5. A built-in well type food warmer comprising:
   (a) a food well having an open top, sidewalls, and a heat conductive bottom wall;
   (b) a heating assembly including:
      (i) a first portion including a thermal insulation means, an electrical heat source supported by said thermal insulation means and a heat conducting member disposed in heat conducting relationship with said heat source,
      (ii) a second portion for supporting said first portion,
      (iii) a resilient mounting means for supporting said first portion from said second portion; and
   (c) a means for releasably securing said heating assembly to said food well including:
      (i) a plurality of downwardly extending elongated hangers secured at their upper ends to said food well adjacent said open top, said hangers secured at their lower ends to said second portion of said heating assembly; and
      (ii) adjusting means for adjusting the length of said hangers whereby as the length of said hangers is shortened, said second portion of said heating assembly is brought into engagement with the bottom surface of said food well, with said first portion of said heating assembly being brought into heat conducting relationship with the heat conducting bottom surface of said food well in response thereto.

6. The food warmer as recited in claim 5 wherein said hangers are comprised of multiple sections with at least one section releasably connected at said adjusting means.

7. The food warmer as recited in claim 6 wherein:
   said food well is fixedly attached to a mounting surface; and
   said heating assembly is detachable from said bottom surface of said food well without requiring access to portions above said mounting surface.

8. The food warmer as recited in claim 5 wherein said bottom surface of said food well includes a first recessed portion for receiving said heat conducting member, and a second portion for engaging said second portion of said heating assembly.

9. The food warmer of claim 5 wherein said resilient mounting means includes at least one spring interposed between said first and second portions of said heating assembly.

10. The food warmer of claim 9 wherein said resilient mounting means includes a means for maintaining said first and second portions of said heating assembly and said spring in an assembled relation whereby said first heating assembly portion is resiliently supported by said second heating assembly portion and said spring.

11. The food warmer of claim 5 wherein said second supporting portion of said heating assembly includes an enclosure which is spaced from and encloses said first portion of said heating assembly whereby heat is contained in the enclosure of said second supporting portion of said heating assembly for transfer to said food well bottom surface.

* * * * *